United States Patent [19]
Tucker

[11] Patent Number: 5,953,056
[45] Date of Patent: Sep. 14, 1999

[54] SYSTEM AND METHOD FOR ENHANCING DISPLAY OF A SPORTING EVENT

[75] Inventor: George Tucker, Berkeley, Calif.

[73] Assignee: Whack & Track, Inc., Berkeley, Calif.

[21] Appl. No.: 08/770,294

[22] Filed: Dec. 20, 1996

[51] Int. Cl.[6] .................................................. H04N 7/18
[52] U.S. Cl. .......................................... 348/157; 348/579
[58] Field of Search .................................... 348/121, 157, 348/601, 578, 579; 473/156, 409; H04N 7/18

[56] References Cited

U.S. PATENT DOCUMENTS

| 3,612,761 | 10/1971 | Wolff | 348/121 |
|---|---|---|---|
| 4,158,853 | 6/1979 | Sullivan et al. | 348/157 |
| 4,160,942 | 7/1979 | Lynch et al. . | |
| 4,393,394 | 7/1983 | McCoy | 348/601 |
| 4,673,183 | 6/1987 | Trahan . | |
| 5,111,410 | 5/1992 | Nakayama et al. | 348/157 |
| 5,342,051 | 8/1994 | Rankin et al. . | |
| 5,413,345 | 5/1995 | Nauck . | |
| 5,489,099 | 2/1996 | Rankin et al. | 473/156 |
| 5,513,854 | 5/1996 | Daver | 348/157 |

OTHER PUBLICATIONS

Yamanouchi, Y., et al. "Real–Time Locus Indication System for a Flying Golf Ball", *SMPTE Journal*, pp. 606–609, Sep. 1995.

*Primary Examiner*—Richard Lee
*Attorney, Agent, or Firm*—Stephen M. Knauer; Flehr Hohbach Test Albritton & Herbert LLP

[57] ABSTRACT

A system and method for enhancing display of a sporting event. A background video image frame is recorded that represents a background video image of the playing field within the large field of view. The path of a ball in a playing field of the sporting event is tracked while the ball is moving. In response, successive overlay video image frames are generated that represent successive overlay video images of the path of the ball within the large field of view but without the playing field in the background. The successive overlay video image frames are combined with the background video image frame so as to generate successive overlaid video image frames. The overlaid video image frames represent successive overlaid video images of the path of the ball in the playing field within a large field of view and comprise the successive overlay video images overlaid on the background video image.

12 Claims, 4 Drawing Sheets

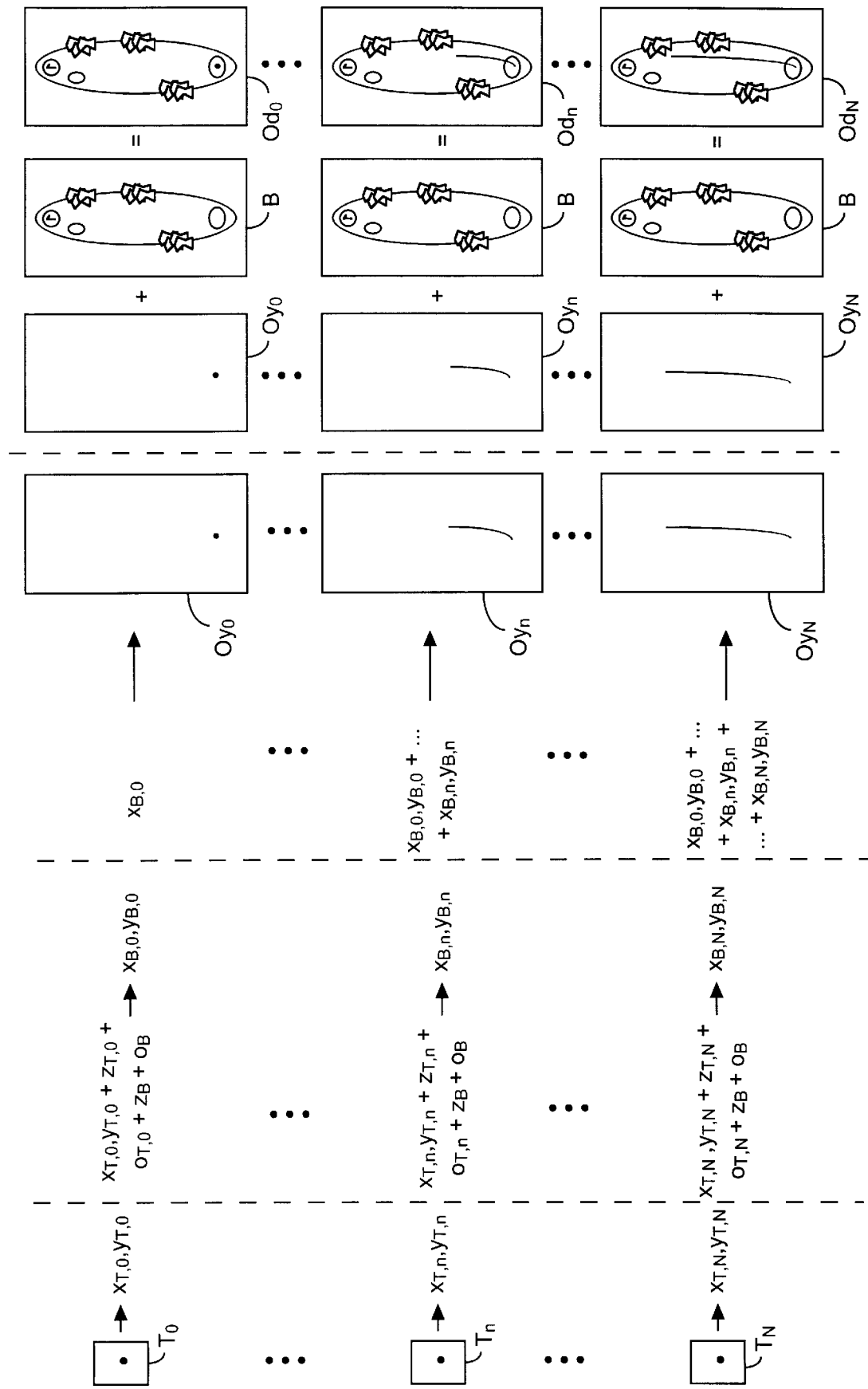

5,953,056

SYSTEM AND METHOD FOR ENHANCING DISPLAY OF A SPORTING EVENT

The present invention relates generally to systems and methods for enhancing display of a sporting event. In particular, it pertains to a system and method for enhancing display of a sporting event by tracking the path of a ball in a playing field of the sporting event while the ball is moving and generating successive overlaid video data frames that represent corresponding successive overlaid video images of the path of the ball within a large field of view of the playing field.

BACKGROUND OF THE INVENTION

In a typical televised broadcast of a sporting event, video cameras are used for displaying the sporting event to viewers. These video cameras provide numerous views and perspectives of the sporting event that enhance display of the sporting event for the viewers. However, for sporting events with a ball that moves rapidly in the sporting event's playing field, such as golf, baseball, football, tennis, soccer, etc., physical constraints prevent these video cameras from accurately tracking the ball within a large field of view of the playing field for continuous near-real time display of the moving ball within the large field of view. Such physical constraints include manual tracking of the ball with the video cameras, the size of the ball, the velocity and acceleration of the ball in the playing field, the weather conditions, the placement of the video cameras, obstructions of view, etc.

Because of the physical constraints just mentioned, the video cameras used in a typical televised broadcast of a sporting event are only able to track and display the ball within a small field of view. This unfortunately provides the viewer with little insight into the overall shape and distance of the path of the ball while it moves in the playing field. In golf, such a small field of view display of a golf ball does not portray the inherent difficulty of a golf shot where, for example, the golfer needs to negotiate a water hazard or a bunker or needs to dramatically bend the golf shot. Similarly, in baseball, such a small field of view display of a baseball does not portray the distance that the baseball was hit or where it was hit.

Some attempts have been made at automatically tracking the flight of a ball in the playing field of a sporting event. For example, U.S. Pat. No. 5,342,051, entitled "APPARATUS AND METHOD FOR TRACKING THE FLIGHT OF A GOLF BALL", issued on Aug. 30, 1994, which is hereby incorporated by reference, describes such an approach. The system and method described in this patent uses a video camera located at the side of a golf hole. When a golfer makes a golf shot, the path of the ball is automatically tracked by the video camera. In doing so, the video camera generates successive video data frames that represent successive video images of the ball within a small field of view. A video frame processor generates from the successive video data frames successive determined position data sets that represent successive determined positions of the ball within the successive video images. From the successive determined position data sets, a flight path predictor generates successive predicted position data sets that represent successive predicted positions of the ball within the video images so as to predict the path of the ball. A tracking motion controller generates motion control signals from the successive predicted position data sets. In response to the motion control signals, the video camera moves and generates the successive video image frames so that the ball is tracked by the video camera while the ball moves. As this is occurring, the tracking motion controller generates successive motion data sets representing the successive motions of the video camera. The successive motion data sets are recorded and then post processed after the golf shot was made to generate a displayable data set representing information on the golf shot.

However, the system and method described in U.S. Pat. No. 5,342,051 is unable to provide tracking of the golf ball within an overhead large field of view of the golf hole for continuous near-real time display of the path of the golf ball within the large field of view. Specifically, because the video camera is located at the side of the golf hole, the displayable data set, when displayed, does not provide an overhead view of the shape and distance of the golf shot within the large field of view. Moreover, because the system and method use post processing, near-real time display of the path of the golf ball is also not provided.

SUMMARY OF THE INVENTION

In summary, the present invention is a system and method for enhancing display of a sporting event. This is done by tracking the path of a ball in a playing field of the sporting event while the ball is moving and generating successive overlaid video image frames that represent successive overlaid video images of the path of the ball in the playing field within a large field of view.

In the system and method, a tracking video camera is positioned over the playing field. The tracking video camera generates successive tracking video image frames that represent successive tracking video images of successive small fields of view containing the ball. From the successive tracking video image frames, successive determined position data sets are generated that represent successive determined positions of the ball within the successive tracking video images. From the successive determined position data sets, successive predicted position data sets are generated that represent successive predicted positions of the ball with respect to the tracking video camera so as to predict the path of the ball. Orientation control signals are generated from the successive predicted position data sets. The tracking video camera adjusts its orientation in response to the orientation control signals and generates the successive tracking video image frames so as to track the ball while the ball is moving.

From the successive position data sets, successive overlay video image frames are generated that represent successive overlay video images of the path of the ball within the large field of view but without the playing field in the background. A background video image frame is recorded earlier that represents a background video image of the playing field within the large field of view. The successive overlay video image frames are combined with the background video image frame so as to generate the successive overlaid video image frames such that the successive overlaid video images comprise the successive overlay video images overlaid on the background video image.

BRIEF DESCRIPTION OF THE DRAWINGS

Additional objects and features of the invention will be more readily apparent from the following detailed description and appended claims when taken in conjunction with the drawings, in which:

FIG. 4 shows how successive overlaid video images are formed by the sporting event display enhancement system.

DESCRIPTION OF THE PREFERRED EMBODIMENTS

Figure 1:
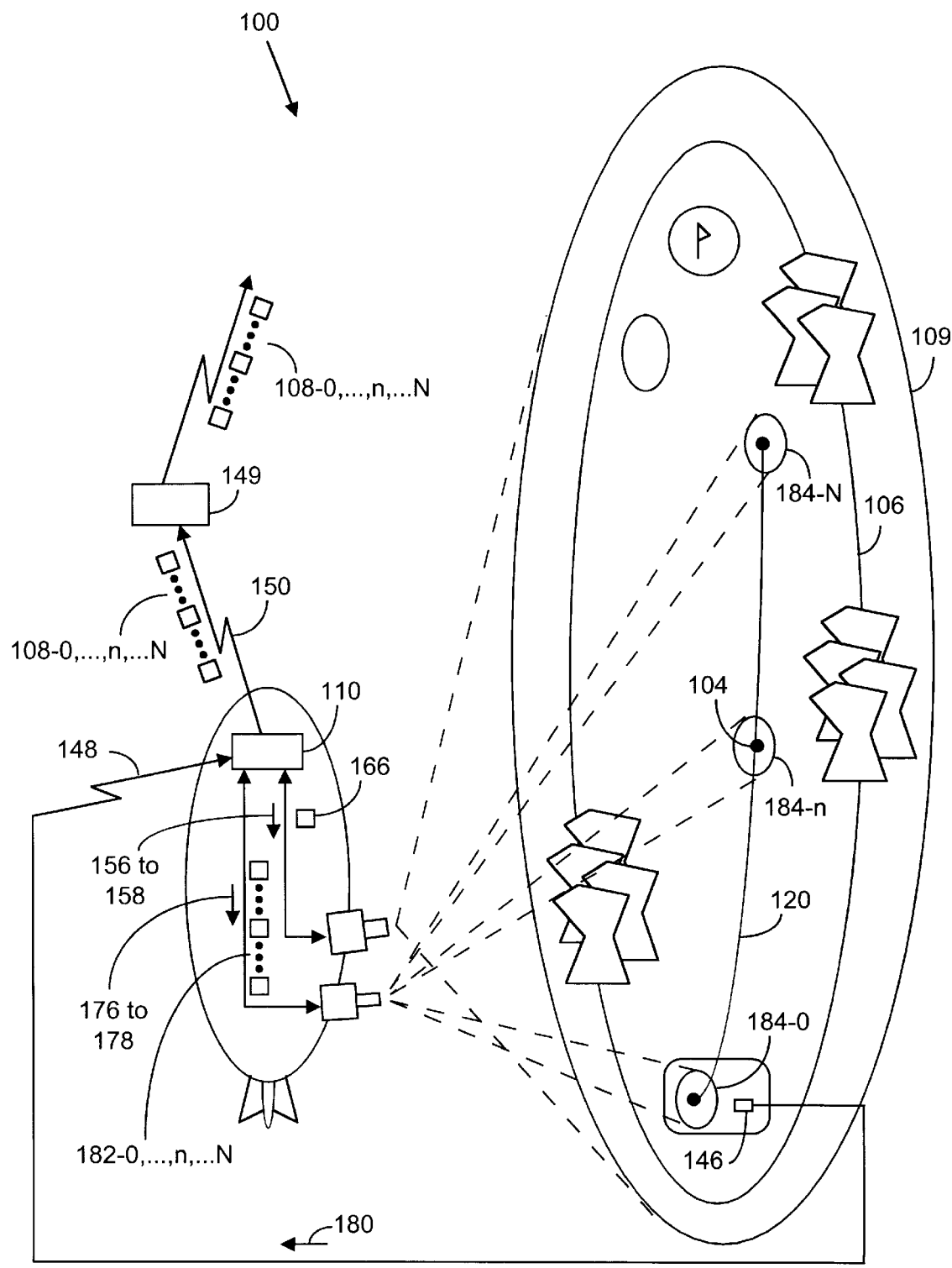
FIG. 1 is a block diagram of a sporting event display enhancement system in accordance with the present invention.

Referring to FIG. 1, there is shown an exemplary embodiment of a sporting event display enhancement system 100 in accordance with the present invention. The system is used to enhance display of a sporting event by tracking the path 102 of a ball 104 in a playing field 106 of the sporting event while the ball is moving and in response generating successive overlaid video image frames 108-0, ..., n, ..., N. The successive overlaid video image frames are generated in near-real time (i.e., approximately less than 1/30 of a second delay) and may be broadcast for display in near-real time. Referring also to FIG. 4, the successive overlaid video image frames represent successive overlaid video images $Od_0, \ldots, Od_n, \ldots, Od_N$ of the path of the ball at the successive processing epochs. These images are from overhead within an overhead large (i.e., wide) field of view 109 containing the playing field.

Referring back to FIG. 1, for illustration purposes, the display enhancement system 100 will be hereinafter described in the context of the sporting event being a golf game, the ball 104 being a golf ball, and the playing field 106 being a golf hole. However, those skilled in the art will recognize that the system disclosed herein is applicable for use in other sporting events, such as baseball, football, tennis, soccer, etc., in which a ball moves rapidly within a playing field.

Figure 2:
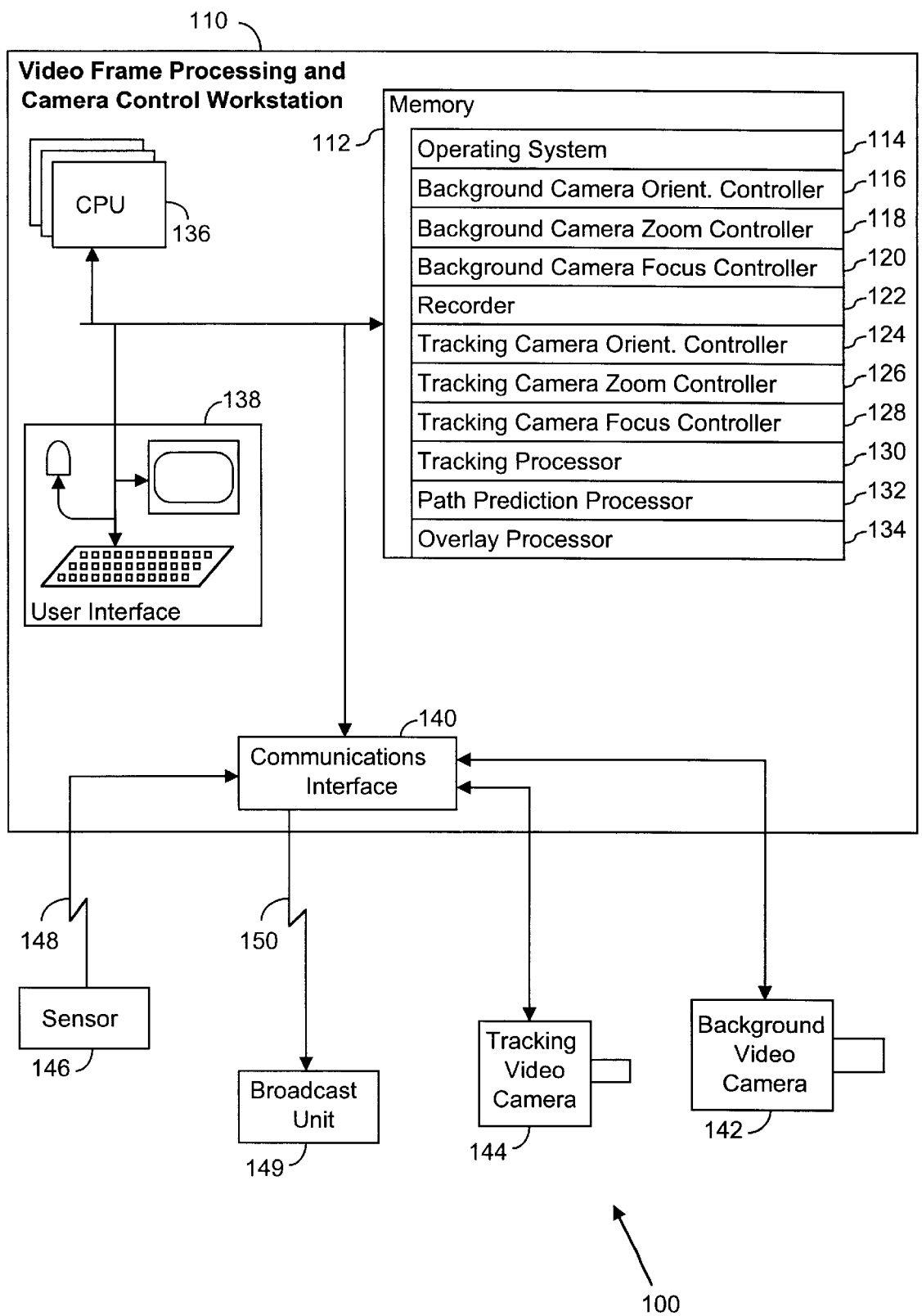
FIG. 2 is a block diagram showing the hardware and software components of the sporting event display enhancement system.

The display enhancement system 100 includes a video frame processing and camera control workstation (wrk) 110 located on a blimp 152. Turning to FIG. 2, the workstation includes a memory 112 that stores a number of programs 114 to 134. These programs include an operating system 114 and processing and control programs 116 to 134. All of these programs are run on the CPU 136 of the workstation. The operating system controls and coordinates running of the processing and control programs in response to commands issued by a user with the user interface 138 of the workstation. The CPU may comprise multiple microprocessors that share the memory and run some or all of the workstation's programs simultaneously. Or, the CPU may comprise a single microprocessor in which case running of the workstation's programs is timed shared.

As shown in FIG. 1, the display enhancement system 100 also includes background and tracking video cameras 142 and 144, a sensor 146, a first communications link 148, and a broadcast unit (br) 149, and a second communications link 150. Referring to FIG. 2, the workstation 110 includes a communications interface 140 that enables certain of the processing and control programs 114 to 134 to communicate with the background and tracking video cameras, with the sensor via the first communications link, and with the broadcast unit via the second communications link.

Referring again to FIG. 1, the background video camera 142 is moveably mounted to the blimp 152 which is positioned over the golf hole 106 so that the background video camera itself is positioned over the golf hole. The background video camera need not be positioned directly over the golf hole and therefore can be positioned over the golf hole on either side of, in front of, or behind the golf hole.

Figure 3:
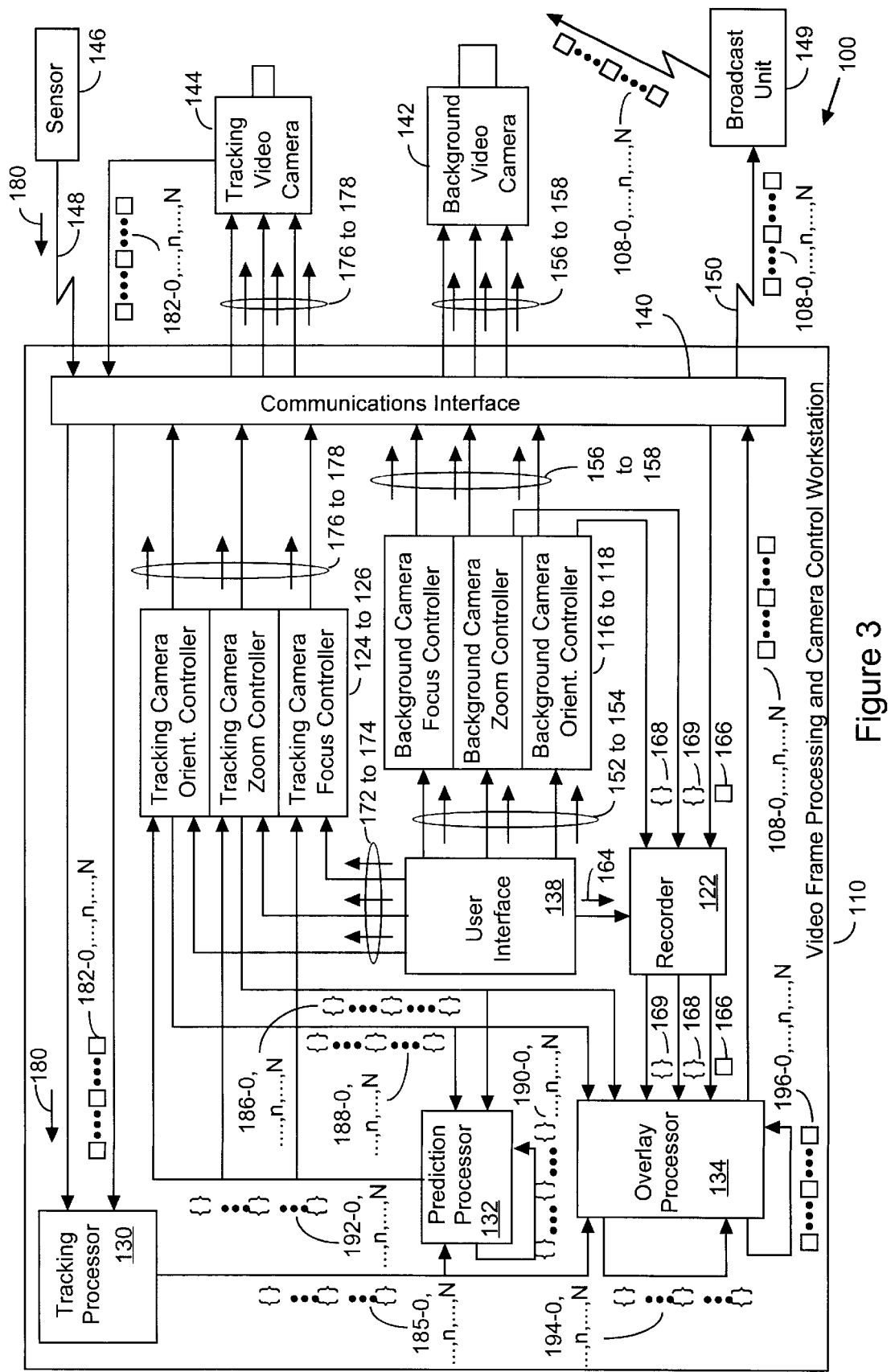
FIG. 3 is a functional block diagram showing the operation of the display enhancement system.
Figure 1:
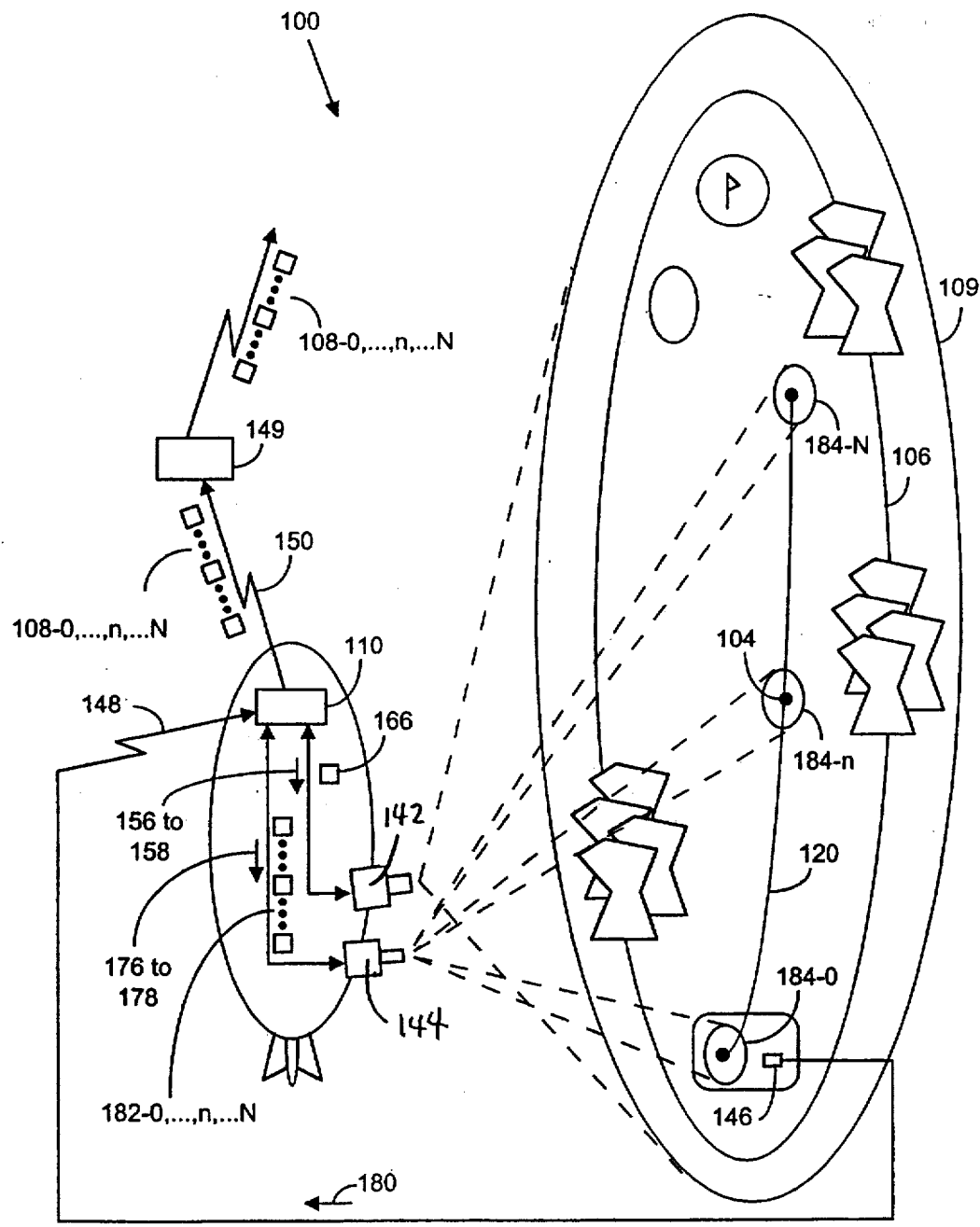

Referring now to FIG. 3, prior to a golf shot, the operation of the display enhancement system 100 begins when the operator of the display enhancement system issues background camera orientation (i.e., direction), zoom, and focus commands 154 to 156 with the user interface 138 to adjust the orientation, zoom, and focus of the background video camera 142. This is done so that, as shown in FIG. 1, the background video camera will be oriented (i.e., directed) toward the golf hole 106, will be zoomed to provide the large field of view 109 containing the golf hole, and will be focused on the golf hole.

Turning back to FIG. 3, the background camera orientation, zoom, and focus commands 154 to 156 issued by the operator of the display enhancement system 100 are respectively received by the background camera orientation, zoom, and focus controllers 116 to 118 which respectively generate in response corresponding background camera orientation, zoom, and focus control signals 158 to 160. The background camera orientation, zoom, and focus control signals are provided to the background video camera 142 via the communications interface 140. In response to these control signals, the background video camera 142 adjusts its orientation, zoom, and focus accordingly so that it is oriented, zoomed, and focused in the manner just described.

The operator of the display enhancement system 100 then issues a record command 164 with the user interface 138 to record the current background video image frame 166 being provided by the background video camera 142 and the current background camera orientation and zoom data sets 168 and 169 being provided by the background camera orientation and zoom controllers 116 and 117. Referring to FIGS. 1 and 4, because the background video camera is oriented, zoomed, and focused in the manner just described, the background video image frame represents an overhead background video image B of the large field of view 109 containing the golf hole 106. Moreover, the current background camera orientation and zoom data sets represent the current orientation $o_B$ and the degree of zoom $z_B$ of the background video camera at the time the background video image frame was generated.

Referring back to FIG. 3, the current background video image frame 166 is received by the recorder 122 via the communications interface 140. In response to the record command 164, the recorder records (i.e., stores) the current background video image frame and the current background camera orientation and zoom data sets 168 and 169. This is done in the memory 112 shown in FIG. 2 in a corresponding storage space of the recorder.

As shown in FIG. 1, the tracking video camera 144 is also moveably mounted on the blimp 152 and is therefore also positioned over the golf hole 106. Like the background video camera 142, the tracking video camera need not be positioned directly over the golf hole and can be positioned over the golf hole on either side of, in front of, or behind the golf hole.

Referring again to FIG. 3, as with the background video camera 142, prior to the golf shot, the operator of the display enhancement system 100 issues tracking camera orientation, zoom, and focus commands 172 to 174 with the user interface 138 to adjust the orientation, zoom, and focus of the tracking video camera 144. As shown in FIG. 1, this is done so that, prior to the golf shot, the tracking video camera is oriented toward the golf ball 104 at the tee of the golf hole, is zoomed to provide an initial small field of view 184-0 containing the golf ball, and is focused on the golf ball. As a result, the tracking video camera will be initialized to track the golf ball.

As shown in FIG. 3, the tracking camera orientation, zoom, and focus commands 172 to 174 are respectively received by the tracking camera orientation, zoom, and focus controllers 124 to 126 which respectively generate in response corresponding tracking camera orientation, zoom, and focus control signals 176 to 178. The tracking camera orientation, zoom, and focus control signals are provided to the tracking video camera 144 via the communications interface 140. In response to these control signals, the tracking video camera adjusts its orientation, zoom, and focus accordingly so that, prior to the golf shot, the tracking video camera is oriented, zoomed, and focused in the manner just described.

Referring back to FIG. 1, the sensor 146 is located near the tee of the golf hole 106. When it senses that the golf ball 104 has been struck by a golfer, it generates a sensor signal 180 indicating that this has occurred. This sensor may be an acoustic or optical sensor, as those skilled in the art will recognize.

Referring now to FIG. 3, the sensor signal 180 is received by the tracking processor 130 via the communications link 148 and the communications interface 140. The communications link may comprise a radio transmission system, a fiber optic cable, and/or other communications devices or elements well known to those skilled in the art. In response to the sensor signal, the tracking processor begins processing successive tracking video image frames 182-0, . . . , n, . . . , N generated at the successive processing epochs 0, . . . , n, . . . , N by the tracking video camera 144 in order to track the golf ball 104. Referring to FIG. 4, the successive tracking video image frames 182-0, . . . ,n, . . . ,N represent successive tracking video images $T_0, \ldots, T_n, \ldots, T_N$ of successive small fields of view 184-0, . . . ,n, . . . ,N containing the golf ball at the successive processing epochs. Thus, each successive tracking video image frame 182-n represents the corresponding successive tracking video image $T_n$ of the corresponding successive small field of view 184-n containing the golf ball at the corresponding successive processing epoch n.

As shown in FIG. 3, the successive tracking video image frames 182-0, . . . ,n, . . . ,N are received by the tracking processor 130 via the communications interface 140. From the successive tracking video image frames, the tracking processor generates at the successive processing epochs 0, . . . , n, . . . , N successive determined location data sets 185-0, . . . ,n, . . . ,N. Referring to FIG. 4, the successive determined location data sets represent successive determined locations $x_{T,0}, y_{T,0}, \ldots, x_{T,n}, y_{T,n}, \ldots, x_{T,N}, y_{T,N}$ of the golf ball 104 at the successive processing epochs in the tracking video images $T_0, \ldots, T_n, \ldots, T_N$.

Referring to FIGS. 3 and 4, the successive determined location data sets 185-0, . . . ,n, . . . ,N are generated in a manner similar to that described in the earlier referenced U.S. Pat. No. 5,342,051 and with known video image frame processing techniques. More specifically, each successive determined location data set 185-n is generated at the corresponding successive processing epoch n from the corresponding successive tracking video image frame 182-n at the epoch and represents the corresponding successive determined location $x_{T,n}, y_{T,n}$ of the golf ball in the corresponding tracking video image $T_n$. And, at each successive processing epoch, the corresponding successive determined location of the golf ball in the corresponding successive tracking video image is determined by locating its center and computing its area.

As shown in FIG. 3, at the successive processing epochs 0, . . . ,n, . . . ,N, the tracking camera orientation and zoom controllers 124 and 125 respectively generate successive tracking camera orientation and zoom data sets 186-0, . . . , n, . . . , N and 188-0, . . . ,n, . . . ,N. Turning to FIGS. 1 and 4, the successive tracking camera orientation and zoom data sets respectively represent the successive orientations $o_{T,0}, \ldots, o_{T,n}, \ldots, o_{T,N}$ and degrees of zoom $z_{T,0}, \ldots, z_{T,n}, \ldots, z_{T,N}$ of the tracking video camera 144 at the successive processing epochs 0, . . . ,n, . . . ,N. Therefore, each successive tracking camera orientation data set 186-n and each successive tracking camera zoom data set 188-n respectively represent the corresponding successive orientation $o_{T,n}$ and degree of zoom $z_{T,n}$ of the tracking video camera at the corresponding processing epoch n.

As shown in FIG. 3, from the successive determined location data sets 185-0, . . . ,n, . . . ,N and the successive tracking camera orientation and zoom data sets 186-0, . . . , n, . . . , N and 188-0, . . . ,n, . . . ,N, the path prediction processor 132 generates successive determined position data sets 190-0, . . . ,n, . . . ,N at the successive processing epochs 0, . . . ,n, . . . ,N. Turning to FIG. 1, the successive determined position data sets represent the successive determined positions of the golf ball in the path 102 at the successive processing epochs with respect to the tracking video camera 144.

Referring to both FIGS. 1 and 3, the successive determined position data sets 190-0, . . . ,n, . . . ,N are generated in a similar manner to that described in the earlier referenced U.S. Pat. No. 5,342,051. Specifically, each successive determined position data set 190-n is generated at the corresponding successive processing epoch n from the corresponding successive determined location data set 185-n and the corresponding successive tracking camera orientation and zoom data sets 186-n and 188-n. Thus, each successive determined position data set represents the corresponding successive determined position of the golf ball 104 in the path 102 at the corresponding successive processing epoch with respect to the tracking video camera 144. And, referring to FIG. 4, each successive determined position is computed at the corresponding successive processing epoch from (1) the corresponding successive determined location $x_{T,n}, y_{T,n}$ of the golf ball in the corresponding successive tracking video image $T_n$ at the epoch, and (2) the corresponding successive orientation $o_{T,n}$ and degree of zoom $z_{T,n}$ of the tracking video camera 144 at the epoch.

As shown in FIG. 3, from the successive determined position data sets 190-0, . . . ,n, . . . ,N, the path prediction processor 132 generates successive predicted position data sets 192-0, . . . ,n, . . . ,N at the successive epochs 0, . . . , n, . . . , N. Referring to FIG. 1, the successive predicted position data sets represent the successive predicted positions of the golf ball 104 in the path 102 at the next successive processing epochs with respect to the tracking video camera 144.

Turning to FIGS. 1 and 3, the successive predicted position data sets 192-0, . . . ,n, . . . ,N are generated in a manner similar to that described in the earlier referenced U.S. Pat. No. 5,342,051. Thus, at each successive processing epoch n, the acceleration and velocity of the golf ball at the epoch are computed from the corresponding successive determined position data set 190-n generated at the epoch and one or more of the previous successive determined position data sets 190-0, . . . ,n, . . . ,N generated at the previous successive processing epochs 0, . . . ,n, . . . ,N. Then, at each successive processing epoch n, horizontal and vertical prediction functions are used to predict the position of the golf ball 104 in the path 102 at the next successive processing epoch n+1 based on the acceleration and velocity computed at the epoch. Thus, each successive predicted position data set 192-n at the corresponding successive processing epoch n represents the corresponding successive predicted position of the golf ball at the next successive processing epoch n+1 with respect to the tracking video camera 144.

Referring to FIG. 3, from the successive predicted position data sets 192-0, . . . ,n, . . . ,N, the tracking camera orientation, zoom, and focus controllers 124 to 126 respectively generate the orientation, zoom, and focus control signals 176 to 178 to adjust the orientation, zoom, and focus of the tracking video camera 144 so that, as shown in FIG. 1, it tracks the golf ball 104 over the successive processing epochs 0, . . . ,n, . . . ,N.

As mentioned earlier and referring to FIG. 3, the tracking camera orientation, zoom, and focus control signals 176 to 178 are provided to the tracking video camera 144 via the communications interface 140. Turning to FIG. 1, in response to the orientation control signal 176, the tracking video camera 144 continuously adjusts its orientation toward the successive predicted positions of the golf ball 104 represented by the predicted position data sets 192-0, . . . , n, . . . , N. In response, to the zoom control signal 177, the tracking video camera continuously adjusts its zoom so that the golf ball contained in the successive initial small fields of view 184-0, . . . ,n, . . . ,N has a constant image size. And, in response to the focus control signal 178, the tracking video camera continuously adjusts its focus to maintain focus on the golf ball. This is done in a manner similar to that described in the earlier referenced U.S. Pat. No. 5,342,051 so that the tracking video camera tracks the golf ball and generates the successive tracking video image frames 182-0, . . . , n, . . . ,N discussed earlier.

Referring again to FIG. 3, in addition to being used for tracking the golf ball 104, the successive determined location data sets 185-0, . . . ,n, . . . ,N and the tracking camera orientation and zoom data sets 186-0, . . . ,n, . . . ,N and 188-0, . . . ,n, . . . ,N are also used by the overlay processor 134 to generate, at the successive processing epochs 0, . . . ,n, . . . ,N, successive estimated location data sets 194-0, . . . ,n, . . . ,N. Turning to FIGS. 1 and 4, the successive estimated location data sets represent estimated locations $x_{B,0}, y_{B,0}, \ldots, x_{B,n}, y_{B,n}, \ldots, x_{B,N}, y_{B,N}$ of the golf ball 104, at the successive processing epochs, from overhead within the large field of view 109, and as they would be in the background video image B. This is done also with the recorded background camera orientation and zoom data sets 168 and 169.

Specifically, referring to FIG. 3, each successive estimated location data set 194-n is generated at the corresponding successive processing epoch n from the corresponding successive determined location data set 185-n, the corresponding tracking camera orientation and zoom data sets 186-n and 188-n, and the recorded background camera orientation and zoom data sets 168 and 169. Turning to FIGS. 1 and 4, each estimated location data set 194-n represents the estimated location $x_{B,n}, y_{B,n}$ of the golf ball 104, at the corresponding successive processing epoch n, from overhead within the large field of view 109, and as it would be in the background video image B. And, each successive estimated location $x_{B,n}, y_{B,n}$ at the corresponding successive processing epoch n is computed from (1) the corresponding determined location $x_{T,n}, y_{T,n}$ of the golf ball in the corresponding tracking video image $T_n$ at the epoch, (2) the corresponding successive orientation $o_{T,n}$ and degree of zoom $z_{T,n}$ of the tracking video camera 144 at the epoch, and (3) the orientation $o_B$ and degree of zoom $z_B$ of the background video camera 142 when the background video image frame 166 was generated and recorded.

As shown in FIG. 3, from the successive estimated location data sets 194-0, . . . ,n, . . . ,N, the overlay processor 134 generates at the successive processing epochs 0, . . . , n, . . . ,N successive overlay video image frames 196-0, . . . , n, . . . ,N. Referring to FIGS. 1 and 4, the successive overlay video image frames represent successive overlay video images $Oy_0, \ldots, Oy_n, \ldots, Oy_N$ of the path 102 of the golf ball 104, at the successive processing epochs, from overhead within the large field of view 109, but without the golf hole 106 in the background.

Specifically, referring to FIG. 3, each successive overlay video image frame 196-n is generated at the corresponding successive processing epoch n from the corresponding successive estimated location data set 194-n and the previous successive estimated location data sets 194-0, . . . ,n−1. And, turning to FIGS. 1 and 4, each successive overlay video image frame represents the corresponding successive overlay video image $Oy_n$ of the path 102 of the golf ball 104, at the corresponding successive epoch, from overhead within the large field of view 109, but without the golf hole 106 in the background. In doing so, the path of the golf ball is estimated by fitting a comma shaped curve to the corresponding successive estimated location $x_{B,n}, y_{B,n}$ and the previous estimated successive locations $x_{B,0}, y_{B,0}, \ldots, x_{B,n-1}, y_{B,n-1}$ using well known numerical processing techniques. In this way, the comma shaped curve represents the path of the golf ball.

Referring again to FIG. 3, at the successive processing epochs 0, . . . ,n, . . . ,N, the overlay processor 134 combines the successive overlay video image frames 196-0, . . . , n, . . . ,N with the background video image frame 166 to generate the successive overlaid video image frames 108-0, . . . ,n, . . . ,N mentioned earlier. This is done using known video frame processing techniques so that, as shown in FIG. 4, the successive overlaid video images $Od_0, \ldots, Od_n, \ldots, Od_N$ represented by the overlaid video image frames comprise the successive overlay video images $Oy_0, \ldots, Oy_n, \ldots, Oy_N$ represented by the overlay video image frames overlaid on the background video image B represented by the background video image frame.

Specifically, referring to FIG. 3, each successive overlaid video image frame 108-n is generated at the corresponding successive processing epoch n by combining the corresponding overlay video image frame 196-n at the epoch with the background video image frame 166. Thus, as shown in FIG. 4, each successive overlaid video image frame 108-n represents the corresponding successive overlaid video image $Od_n$ of the path 102 of the golf ball 104 at the corresponding processing epoch and from overhead within the large field of view 109 containing the golf hole 106. Moreover, the successive overlaid video image frames are generated in near-real time since each successive overlaid video image frame is generated at the corresponding successive processing epoch.

The successive overlaid video image frames 108-0, . . . , n, . . . ,N are provided at the successive processing epochs 0, . . . ,n, . . . ,N to the broadcast unit 149 via the communications link 150 with each successive overlaid video image frame 108-n being provided at the corresponding successive processing epoch n. As shown in FIG. 1, the broadcast unit is located on the ground. The broadcast unit then broadcasts the successive overlaid video image frames for display on the television sets of viewers of the sporting event. This may be done so that the successive overlaid video image frames are broadcast at the successive processing epochs with each successive overlaid video image frame being broadcast at the corresponding successive processing epoch. Thus, in this case, the successive overlaid video image frames are broadcast in near-real time for display in near-real time. Alternatively, the successive overlaid video image frames may be recorded by the broadcast unit and then broadcast for display at a later time.

In the embodiment shown in FIG. 1, the tracking and background video cameras 142 and 144 were described as being moveably mounted on a blimp 152. However, those skilled in the art will recognize that these cameras could also be moveably mounted to another type of aircraft or a support structure located over the golf hole 106. Moreover, a single video camera could be used to perform the operations of both the tracking and background video cameras.

Furthermore, the workstation 110 was described as being located on the blimp 152. However, those skilled in the art will recognize that the display enhancement system 100 could have a camera control workstation located in the blimp and close to the background and tracking video cameras 142 and 144 and a video frame processing workstation located on the ground. In this case, both the camera control and video frame processing workstations would include the memory 112, the CPU 136, the user interface 138, the communications interface 140, and the operating system 114. However, the camera control workstation would include the master and tracking camera orientation, zoom, and focus controllers 116, 118, 120, 124, 126, and 128 and the video frame processing workstation would include the recorder 122, the tracking processor 130, the path prediction processor 132, and the overlay processor 134. In this case, the communication link 148 would be used to provide the sensor signal 180 to the tracking processor 130 of the video frame processing workstation. And, the communications link 150 would be used to provide the successive predicted position data sets 192-0, . . . ,n, . . . ,N to the tracking camera orientation, zoom, and focus controllers, to provide the background video image frame 166 to the recorder, and to provide the successive tracking video image frames 182-0, . . . ,n, . . . ,N to the tracking processor.

As another alternative embodiment, the master and tracking camera orientation, zoom, and focus controllers 116, 118, 120, 124, 126, and 128, the recorder 122, the tracking processor 130, the path prediction processor 132, and the overlay processor 134 could all be discrete units. In this case, each of these units would include a programmed microprocessor or digital signal processor (DSP) for performing the corresponding operations described earlier.

Furthermore, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for enhancing display of a sporting event by tracking the path of a ball in a playing field of the sporting event while the ball is moving and generating successive overlaid video image frames that represent successive overlaid video images of the path of the ball in the playing field within an overhead large field of view over the playing field, the system comprising:

a tracking video camera positioned over the playing field that generates successive tracking video image frames while the ball is moving that represent successive tracking video images of successive overhead small fields of view that contain the ball and are within the overhead large field of view;

a tracking processor that generates from the successive tracking video image frames successive determined position data sets that represent successive determined positions of the ball within the successive tracking video images;

a path prediction processor that generates from the successive determined position data sets successive predicted position data sets that represent successive predicted positions of the ball with respect to the tracking video camera so as to predict the path of the ball;

tracking camera orientation, zoom, and focus controllers that generate tracking orientation, zoom, and focus control signals from the successive predicted position data sets;

the tracking video camera adjusting its orientation, zoom, and focus in response to the tracking orientation, zoom, and focus control signals so as to be oriented toward, zoomed in on, and focused on the ball in the overhead small fields of view while the ball is moving so that the ball is tracked;

a background video camera that is positioned over the playing field and generates a background video image frame that represents a background video image of the playing field within the overhead large field of view; and an overlay processor that (1) generates from the successive determined position data sets successive overlay video image frames that represent successive overlay video images of the path of the ball within the overhead large field of view but without the playing field in the background, and (2) combines the successive overlay video image frames with the background video image frame so as to generate the successive overlaid video image frames such that the successive overlaid video images comprise the successive overlay video images overlaid on the background video image.

2. The system of claim 1 wherein the overlay processor (1) generates the successive overlay video image frames in near real time from the successive determined position data sets, and (2) combines the successive overlay video image frames with the background video image frame in near real time to generate the successive overlaid video image frames in near real time.

3. The system of claim 2 further comprising a broadcast unit that broadcasts the successive overlaid video image frames in near real time for display in near-real time.

4. The system of claim 1 further comprising:

background orientation, zoom, and focus controllers that generate background orientation, zoom, and focus control signals and background orientation and zoom data sets representing the orientation and degree of zoom of the background video camera when the background video image frame is generated;

the background video camera adjusting its orientation, zoom, and focus in response to the background orientation, zoom, and focus control signals so as to be oriented toward, zoomed in on, and focused on the playing field in the large field of view;

the tracking camera orientation and zoom controllers also generating from the successive predicted position data sets successive tracking orientation and zoom data sets representing the successive orientations and degrees of zoom of the tracking video camera when the successive tracking video image frames are generated; and the overlay processor generates the successive overlay video image frames also from the successive tracking orientation and zoom data sets and the background orientation and zoom data sets.

5. The system of claim 1 wherein:

the background video image frame is generated before the ball moves;

the system further comprises a recorder that records the background video image frame.

6. The system of claim 1 wherein the overlay processor generates the successive overlay and overlaid video images such that the path of the ball in the successive overlay and overlaid video images is represented by a comma shaped curve.

7. A method for enhancing display of a sporting event by tracking the path of a ball in a playing field of the sporting event while the ball is moving and generating successive overlaid video image frames that represent successive overlaid video images of the path of the ball in the playing field within an overhead large field of view over the playing field, the method comprising:

positioning a tracking video camera over the playing field;

with the tracking video camera, generating successive tracking video image frames while the ball is moving that represent successive tracking video images of successive overhead small fields of view that contain the ball and are within the overhead large field of view;

generating from the successive tracking video image frames successive determined position data sets that represent successive determined positions of the ball within the successive tracking video images;

generating from the successive determined position data sets successive predicted position data sets that represent successive predicted positions of the ball with respect to the tracking video camera so as to predict the path of the ball;

generating tracking orientation, zoom, and focus control signals from the successive predicted position data sets;

adjusting the tracking video camera's orientation, zoom, and focus in response to the tracking orientation, zoom, and focus control signals so that the tracking video camera is oriented toward, zoomed in on, and focused on the ball in the overhead small fields of view while the ball is moving so that the ball is tracked;

positioning a background video camera over the playing field;

with the background video camera, generating a background video image frame that represents a background video image of the playing field within the overhead large field of view;

generating from the successive determined position data sets successive overlay video image frames that represent successive overlay video images of the path of the ball within the overhead large field of view but without the playing field in the background; and combining the successive overlay video image frames with the background video image frame so as to generate the successive overlaid video image frames such that the successive overlaid video images comprise the successive overlay video images overlaid on the background video image.

8. The method of claim 7 wherein:

the successive overlay video image frames are generated in the overlay video image frames generating step in near real time from the successive determined position data sets; and the successive overlay video image frames are combined in the combining step with the background video image frame in near real time to generate the successive overlaid video image frames in near real time.

9. The method of claim 8 further comprising the step of broadcasting the successive overlaid video image frames in near real time for display in near-real time.

10. The method of claim 7 further comprising the steps of:

generating background orientation, zoom, and focus control signals and background orientation and zoom data sets representing the orientation and degree of zoom of the background video camera when the background video image frame is generated;

adjusting the background video camera's orientation, zoom, and focus in response to the background orientation, zoom, and focus control signals so that the background video camera is oriented toward, zoomed in on, and focused on the playing field in the large field of view;

generating from the successive predicted position data sets successive tracking orientation and zoom data sets representing the successive orientations and degrees of zoom of the tracking video camera when the successive tracking video image frames are generated; and the successive overlay video image frames being generated in the overlay video image frames generating step also from the successive tracking orientation and zoom data sets and the background orientation and zoom data sets.

11. The method of claim 7 wherein:

the background video image frame is generated in the background video image frame generating step before the ball moves;

the method further comprises the step of recording the background video image frame.

12. The method of claim 7 wherein the successive overlay and overlaid video images are generated in the overlay video image frames generating and combining steps such that the path of the ball in the successive overlay and overlaid video images is represented by a comma shaped curve.

* * * * *

UNITED STATES PATENT AND TRADEMARK OFFICE
CERTIFICATE OF CORRECTION

PATENT NO. : 5,953,056
DATED : September 14, 1999
INVENTOR(S) : Tucker

It is certified that error appears in the above-identified patent and that said Letters Patent is hereby corrected as shown below:

Drawings,

Drawing sheet, consisting of Fig. 1, should be deleted to9 be replaced with the drawing sheet, consisting of Fig. 1, as shown on the attached page.

UNITED STATES PATENT AND TRADEMARK OFFICE
CERTIFICATE OF CORRECTION

PATENT NO. : 5,953,056
DATED : September 14, 1999
INVENTOR(S) : Tucker

It is certified that error appears in the above-identified patent and that said Letters Patent is hereby corrected as shown below:

Column 4,
Line 5, replace «154 to 156» with --152 to 154--.
Line 13, replace "154 to 156" with --152 to 154--.
Line 20, replace "158 to 160" with --156 to 158--.

Column 10,
Line 3, replace "position" with --location--.
Line 4, replace "position" with --locations--.
Line 7, replace "position" with --location--.
Line 12, insert --camera-- between "tracking" and "orientation".
Line 16, insert --camera-- between "tracking" and "orientation".
Line 27, replace "position" with --location--.
Line 39, replace "position" with --location--.
Line 49, insert --camera-- between "background" and "orientation".
Line 50, insert --camera-- between "background" and "orientation".
Line 57, insert --camera-- between "background" and "orientation".
Line 62, insert --camera-- between "tracking" and "orientation".
Line 67, insert --camera-- between "tracking" and "orientation".

Signed and Sealed this

Eighth Day of January, 2002

*Attest:*

JAMES E. ROGAN
*Director of the United States Patent and Trademark Office*

*Attesting Officer*